United States Patent
Bach

(10) Patent No.: US 8,844,433 B2
(45) Date of Patent: Sep. 30, 2014

(54) DETECTION OF AIRFLOW IN AN APPLIANCE

(75) Inventor: James Carter Bach, Seymour, IN (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 13/346,870

(22) Filed: Jan. 10, 2012

(65) Prior Publication Data

US 2013/0174746 A1 Jul. 11, 2013

(51) Int. Cl.
 *A21B 1/26* (2006.01)
(52) U.S. Cl.
 USPC ............ 99/476; 99/473; 219/400; 219/681; 126/21 A; 73/861.77; 73/861.79
(58) Field of Classification Search
 USPC ........... 99/476, 473, 474, 475, 477, 478, 479; 126/21 A; 219/400, 681; 73/861.77, 73/861.79

See application file for complete search history.

(56) References Cited

U.S. PATENT DOCUMENTS

| | | | | |
|---|---|---|---|---|
| 4,831,238 A * | 5/1989 | Smith et al. | ................... | 219/400 |
| 6,772,752 B1 | 8/2004 | Boyer | | |
| 6,789,434 B2 * | 9/2004 | Peterson | ................... | 73/861.77 |
| 7,176,415 B2 * | 2/2007 | Kamitani et al. | ............. | 219/400 |
| 7,687,748 B2 * | 3/2010 | Gagas | ........................... | 219/623 |
| 7,886,658 B2 * | 2/2011 | McFadden et al. | ............. | 99/476 |
| 2007/0102418 A1 * | 5/2007 | Swank et al. | ................. | 219/400 |

* cited by examiner

*Primary Examiner* — Reginald L Alexander
(74) *Attorney, Agent, or Firm* — Dority & Manning, P.A.

(57) ABSTRACT

The present invention provides for measuring the air flow in an appliance. An air flow measuring device, such as a vane (aka turbine) anemometer, is placed directly into an air flow passageway and provides a signal indicative of the amount of air flow. This signal can be used e.g., to undertake a remedial response in the event the amount of air flow is not sufficient to provide proper cooling or ventilation of the appliance.

16 Claims, 3 Drawing Sheets

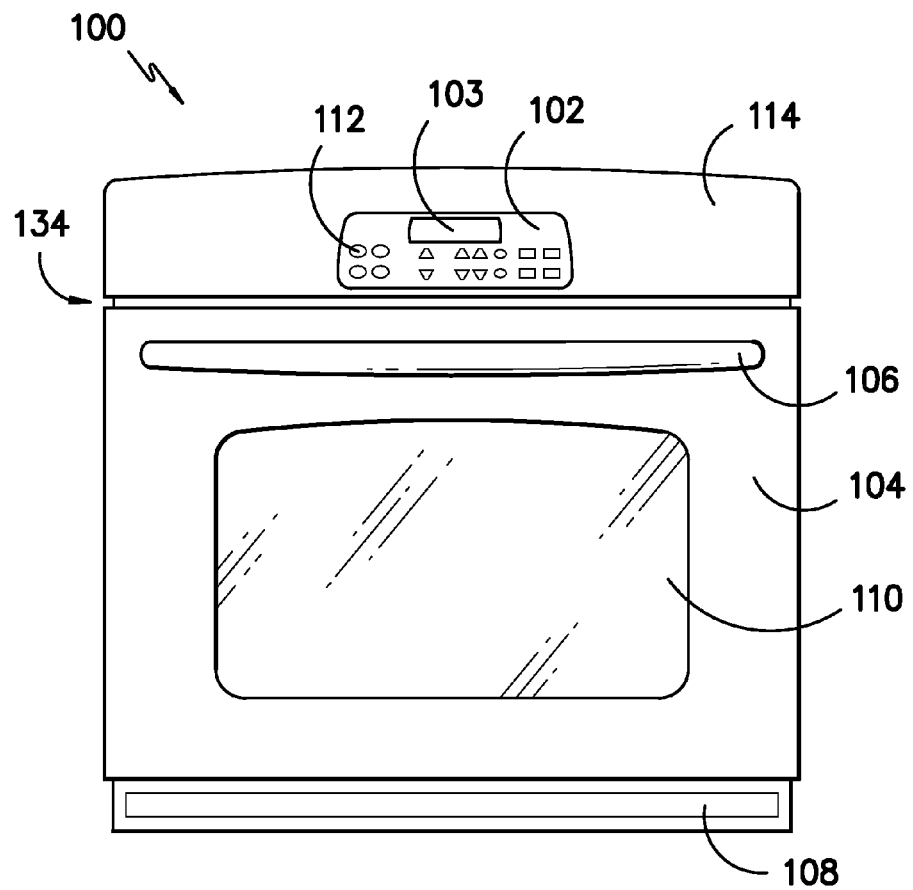
FIG. -1-

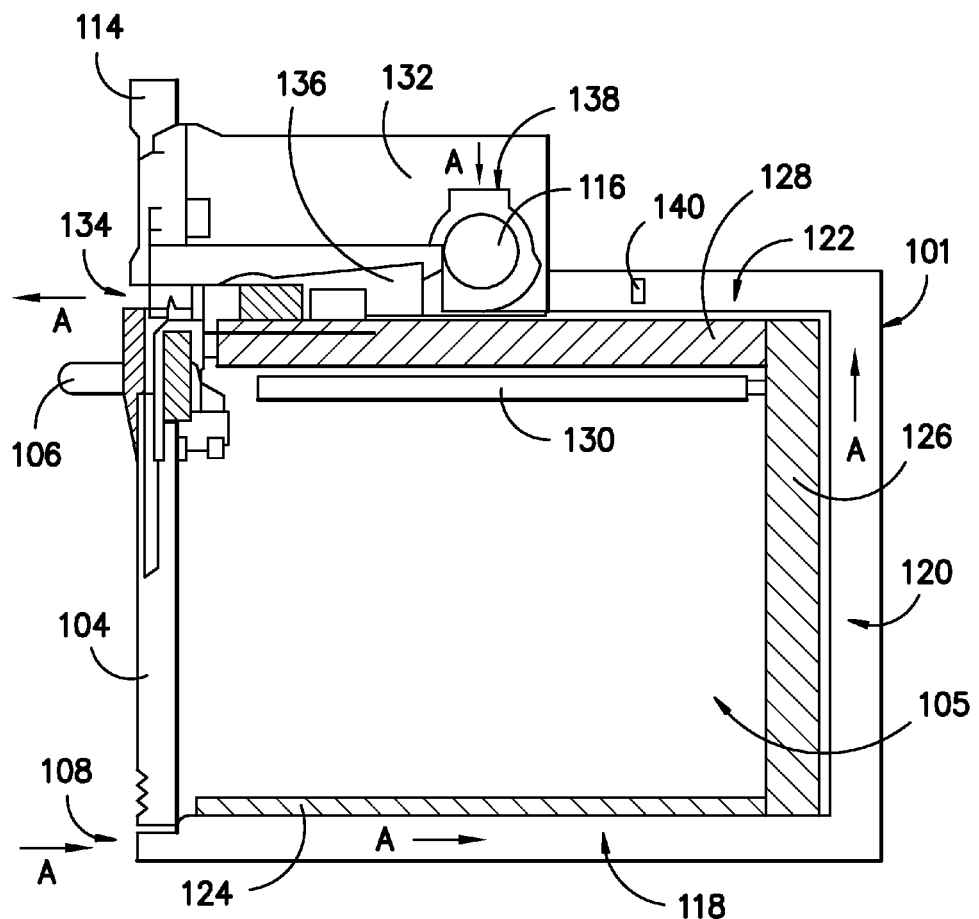
FIG. -2-

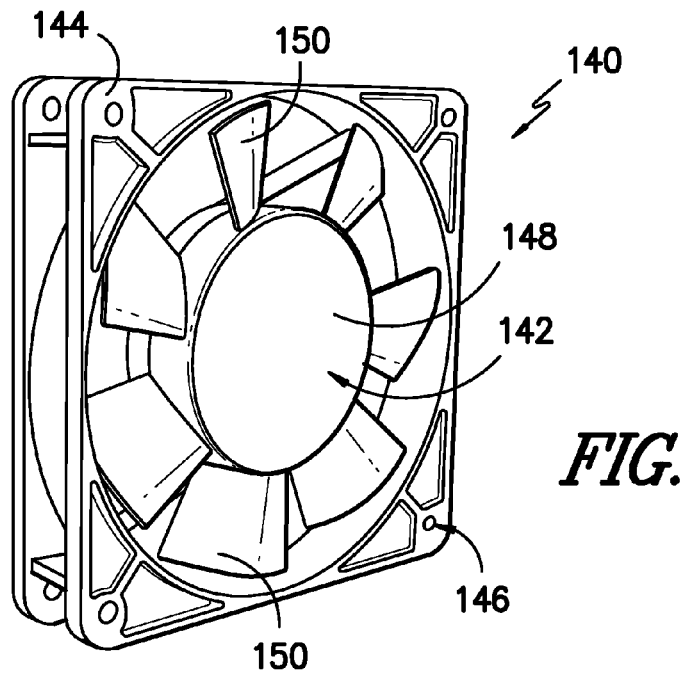
FIG. -3-
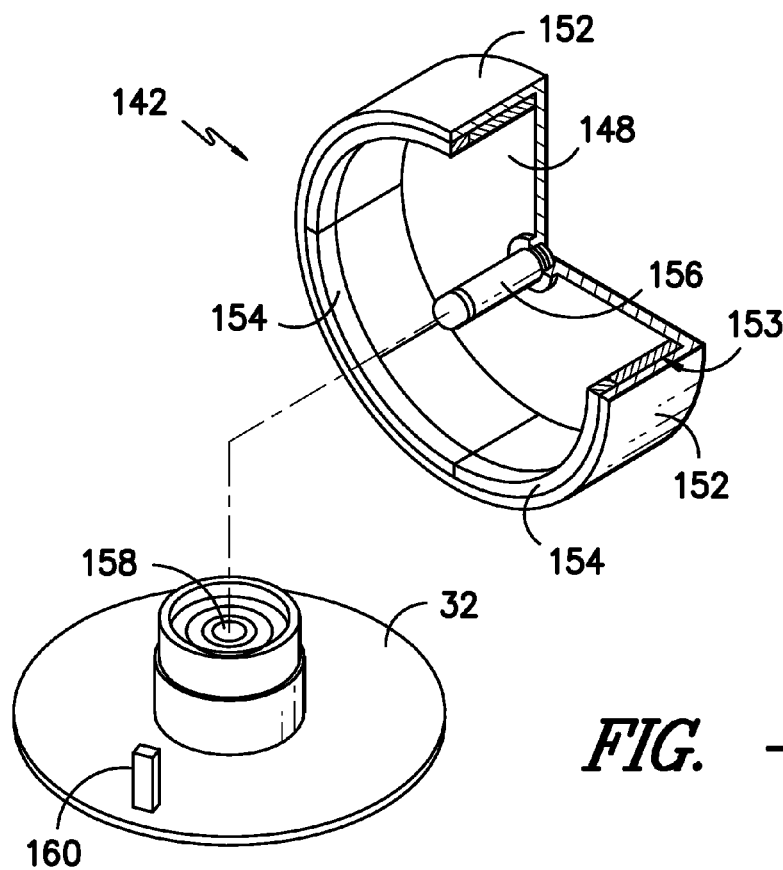
FIG. -4-

DETECTION OF AIRFLOW IN AN APPLIANCE

FIELD OF THE INVENTION

The subject matter of the present disclosure generally relates to appliances, and more particularly, the detection of an air flow, and/or measuring airflow velocity, in a pathway of an appliance.

BACKGROUND OF THE INVENTION

The operation of an oven appliance necessarily generates a large amount of heat. One or more gas and/or electric heating elements located in the cooking chamber provide heat not only for cooking but also for cleaning operations as well. For example, typically an oven appliance will be provided with a cleaning cycle where temperatures in the oven can reach over 800° F.

While oven appliances come in a variety of configurations, including stand-alone (aka free-standing), frequently they are designed for placement within cabinetry or some other enclosure built into a kitchen space. Frequently, such cabinetry or other enclosure is constructed from wood or a wood-based product. Proper cooling of the oven is required to e.g., prevent a dangerous condition where the oven might create unacceptable exterior temperatures.

Ovens are frequently provided with one or more cavities or ventilation ducts positioned outside of the cooking chamber and typically within the cabinet of the appliance. These ducts are used to direct a flow of air—i.e. ventilation—through the appliance so as to cool the appliance, particularly during high temperature operations such as self-cleaning. Such ducts may be provided in a variety of configurations on one or more sides of the appliance including the top and bottom.

Some oven appliances have conventionally relied upon convection to provide a movement of air through the ducts that cools the appliance. The size of such air ducts can be increased where higher temperatures are expected. Unfortunately, the space provided for the air ducts typically comes at the expense of cooking space in the cooking chamber. For example, the overall size of oven appliances is generally standardized due to cabinetry sizes and other restrictions. Increasing the cross-section or volume of the ducts necessarily decreases the size of the cooking chamber.

As a result, oven appliances are commonly provided with a fan or blower to provide a forced air flow through the ducts or ventilation system of the appliance. Such forced air flow improves the cooling ability of the appliance and can allow for a reduction in the size of the ducts, vents, and the like that would otherwise be necessary if only natural convection were relied upon for cooling.

Where a fan is employed, it is important to ensure that the fan is actually operating so as to provide an air flow through the ventilation system. However, simply determining whether power is being provided to the fan or e.g., measuring whether the fan is drawing a current or e.g. measuring the RPM of the fan may not ensure that air flow through the ventilation system is occurring and, even if it is, whether the rate of air flow is sufficient to provide the amount of cooling required. For example, the fan could be consuming power and yet malfunctioning for some reason. If vent ducts on the appliance are blocked or clogged for some reason, air flow may be insufficient even if the fan is operating at the proper RPM.

Accordingly, an oven appliance having a fan that provides for cooling during cooking or cleaning operations would be useful. Such an oven appliance that also includes a system for determining whether a sufficient flow of air through the ventilation passages is occurring during oven operation would also be beneficial. An oven appliance that can also take one or more remedial actions in the event the flow of air is insufficient for properly cooling the oven would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment, the present invention provides an oven appliance that includes a cabinet and a cooking chamber for the receipt of items to be cooked. The chamber is located within the cabinet. A heating element is provided for supplying heat to a food item placed into the cooking chamber. A door provides for selective access to the cooking chamber. An air passageway at least partially surrounding the cooking chamber is positioned at least in part between the cabinet and the cooking chamber. A fan is connected with the air passageway and configured for selectively causing a flow of air through the air passageway. An air flow measuring device is positioned in the air passageway and is positioned so as to be within the flow of air through the passageway that is caused by the fan.

For this exemplary embodiment, the air flow measuring device includes a rotatable impeller disposed within the air passageway. A sensor is positioned adjacent to the rotatable impeller. The sensor is configured for measuring the rotational speed of the impeller.

In another aspect of the present invention, a method for measuring a flow of air in an appliance is provided. The flow of air is created by a fan of the appliance. The method includes the steps of placing a rotatable impeller into the flow of air created by the fan; detecting the rotations of the impeller; creating a signal indicative of the rotational speed of the impeller; and, determining whether the rotational speed meets a predetermined level and, if not, then undertaking a remedial response with regard to the operation of the appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a front view of an exemplary embodiment of an oven as may be used with the present invention.

FIG. 2 provides a cross-sectional view of the exemplary embodiment of FIG. 1.

FIG. 3 is a perspective view of an exemplary embodiment of an air flow measuring device, in this example a vane anemometer, as may be used with the present subject matter.

FIG. 4 provides an exploded and partial cut-away view of the hub portion of the device shown in FIG. 3.

DETAILED DESCRIPTION OF THE INVENTION

The present invention provides for measuring the ventilation air flow in an appliance. An air flow measuring device, such as a vane anemometer, is placed directly into an air flow passageway and provides a signal indicative of the amount of air flow within said passageway. This signal can be used e.g., to undertake a remedial response in the event the amount of air flow is not sufficient to provide proper cooling of the appliance.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. Similarly, although the chassis cooling of an oven appliance is illustrated, the present invention can also be applied to other appliances, such as, but not limited to, a clothes dryer (exhaust air flow measurement), a refrigerator (internal cooling air flow measurement), a microwave oven (chassis cooling and cavity air flow measurement), a window air conditioner, a room air purifier, a dehumidifier, or a computer server tower (internal cooling air flow measurement).

Referring to FIGS. 1 and 2, an exemplary embodiment of an oven 100 according to the present invention is shown. FIG. 1 provides a front view of oven 100 while FIG. 2 provides a cross-sectional view. Oven 100 includes a door 104 with handle 106 that provides for opening and closing access to a cooking chamber 105. A user of the appliance 100 can place a variety of different items to be cooked in chamber 105. A heating element 130 at the top of chamber 105 provides a heat source for cooking. Heating element 130 can be gas, electric, microwave, or a combination thereof. Other heating elements could be located at the bottom of chamber 130 as well. Racks (not shown) in chamber 105 can be used to place food items at various levels for cooking A window 110 on door 104 allows the user to view e.g., food items during the cooking process.

Oven 100 includes a user interface 102 having a display 103 positioned on a top panel 114 with a variety of controls 112. Interface 102 allows the user to select various options for the operation of oven 100 including e.g., temperature, time, and/or various cooking and cleaning cycles. Operation of oven appliance 100 can be regulated by a controller (not shown) that is operatively coupled i.e., in communication with, user interface panel 102, heating element 130, and other components of oven 100 as will be further described.

For example, in response to user manipulation of the user interface panel 102, the controller can operate heating element 130. The controller can receive measurements from a temperature sensor (not shown) placed in cooking chamber 105 and e.g., provide a temperature indication to the user with display 103. The controller can also be provided with other features as will be further described herein.

By way of example, the controller may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout appliance 100. In the illustrated embodiment, the controller may be located under or next to the user interface 102 otherwise within top panel 114. In such an embodiment, input/output ("I/O") signals are routed between the controller and various operational components of appliance 100 such heating element 130, controls 112, display 103, sensor(s), alarms, and/or other components as may be provided. In one embodiment, the user interface panel 102 may represent a general purpose I/O ("GPIO") device or functional block.

Although shown with touch type controls 112, it should be understood that controls 112 and the configuration of appliance 100 shown in FIG. 1 is provided by way of example only. More specifically, user interface 102 may include various input components, such as one or more of a variety of electrical, mechanical or electro-mechanical input devices including rotary dials, push buttons, and touch pads. The user interface 102 may include other display components, such as a digital or analog display device designed to provide operational feedback to a user. The user interface 102 may be in communication with the controller via one or more signal lines or shared communication busses. Also, oven 100 is shown as a wall oven but the present invention could also be used with other appliances such as e.g., a stand-alone oven, an oven with a stove-top, and other configurations as well.

As stated, during operation of oven 100 in both cooking and cleaning cycles, the temperatures that are needed in chamber 105 can be high. Insulation panels 124, 126, and 128 in the bottom, rear, and top of oven 100 help minimize reduce heat transfer from oven 100 to e.g., surrounding cabinetry. Additionally, oven 100 is provided with a ventilation system whereby ambient air is used to help cool appliance 100.

More specifically, oven 100 includes air passageways 118, 120, and 122 located within the bottom, rear, and top of the cabinet 101 of oven 100. A blower or fan 116 located in cavity 132 pulls heated air into its inlet 138. This air is forced through duct 136 and exits oven 100 through vent 134 located between door 104 and top panel 114. Fan 116 pulls air from the electronics bay (enclosure) 132, which is connected with air passageways 118, 120, 122. Cooler air from the ambient is pulled into air passageway 118 through air inlet 108, which is located below door 104. The flow of air is indicated by arrows A in FIG. 2. The ventilation system described for oven 100 is provided by way of example only. As will be understood by one of skill in the art using the teachings disclosed herein, numerous other configurations may be used as well. By way of example, the flow of air could be reversed by changing the direction of operation of fan 116. Different arrangements of the air passageways may also be used as well.

As previously stated, to ensure that proper ventilation occurs during operation, oven 100 is provided with an air flow measuring device 140 that is positioned within air passageway 122 for this exemplary embodiment. Device 140 could also be placed in other locations as well including e.g., air passageways 118 and 120. Although shown mounted upstream of fan 116 in terms of air flow A, device 140 could also be located downstream of fan 116 e.g. air passageway 136. Device 140 can be used not only to determine whether air is flowing through the ventilation system of oven 100 but can also be used to determine the rate of air flow.

FIG. 3 provides a perspective view of air flow measuring device 140 that, for this exemplary embodiment, operates as a vane (aka turbine) anemometer. More particularly, device 140 includes a rotatable impeller 142 mounted within a frame 144. Frame 144 includes several apertures 146 that can be used for mounting device 140 within oven 100.

As shown in FIGS. 3 and 4, rotatable impeller 142 includes a rotatable hub 148. A plurality of blades 150 are attached to an exterior circumferential surface 152 of hub 148. When placed into a flow of air, blades 150 cause impeller 142 to rotate within frame 144.

The rotatable hub 148 of impeller 142 also defines an interior circumferential surface 153 to which a plurality of magnets, or a single magnet comprising a plurality of N-S pairs, 154 is attached. Magnets 154 rotate with hub 148 whenever impeller 142 is placed into an air flow path. Hub 148 rotates about a shaft 156 received into a hole 158 defined by rear plate 162, which is attached to frame 144. Rear plate 162 remains stationary and does not rotate with hub 148 when placed into an air flow. A bearing system within 158 allows the hub to spin freely and with little frictional drag.

As shown in FIG. 4, a magnetic sensor 160 is positioned on rear plate 162 and is located adjacent to the rotatable impeller 142. More specifically, sensor 160 is placed near the magnets 154 positioned on the interior circumferential surface 153 of hub 148 and is within the magnetic field provided by magnets 154.

For this exemplary embodiment of air flow measuring device 140, sensor 160 is a Hall effect sensor. As such, when device 140 experiences an air flow in air passageway 122, the rotations of impeller 142 subject the Hall effect sensor 160 to a changing magnetic field that can be used to provide a pulse train indicative of the rotation of impeller 142. Additionally, this pulse train can also be used to determine the rate of rotation of impeller 142 and, consequently, the air flow rate through the ventilation system of appliance 100.

Other sensor arrangements may be used well. For example, the magnets and magnetic sensor described above could be replaced with an optical sensor and a means to either reflect or block light to/from the optical sensor as a way to generate the RPM-indicative pulses. Additionally, the "radial" blade arrangement illustrated in FIG. 3 is only one of several impeller designs that could implement this invention. "Paddle wheel" or "squirrel cage" impeller arrangements could also be used, for example.

The controller discussed previously can be configured to be in communication with sensor 160 so as receive the signal or pulse train therefrom. By determining from this signal the speed of rotation of impeller 142 and/or the flow rate of air past impeller 142, the controller can determine whether the flow of air through the air passageway 122 meets a level or amount that has been predetermined as sufficient for properly cooling of oven 100.

In the event the measured air flow is sufficient, the controller can e.g., continue monitoring the air flow. Alternatively, if the air flow is not sufficient—i.e., does not meet or exceed the predetermined level—then the controller can take one or more remedial actions. For example, the controller could provide a visible and/or audible alarm to the user of the appliance, or could even send a message to the user's home computer or cellular telephone. Alternatively, or in addition thereto, the controller could deactivate heating element 130 or reducing the heat output from element 130 to a level for which oven 100 could operate safely.

Other methods of operation could be applied to oven appliance 100 as well using air flow measuring device 140. For example, chamber 105 could be equipped with a temperature measuring device or sensor. The controller could be configured to receive signals from such temperature device that are indicative of the temperature in chamber 105. Meanwhile, the controller would also receive a signal from air flow measuring device 140 that indicates the air flow rate—i.e., the amount of ventilation or cooling—of oven 100. The amount of ventilation required for proper cooling of oven 100 can vary depending upon the temperature within chamber 105. Accordingly, the controller can be programmed to determine what amount of air flow (i.e. what rotational speed of impeller 142) is needed for a given temperature in chamber 105. For example, the levels of air flow/rotational speed of impeller 142 needed for a given temperature in chamber 105 can be predetermined and programmed into the controller. As previously described, the controller can take one or more remedial steps if the proper amount of ventilation is not detected using air flow measuring device 140.

The above embodiment was described within regard to the use of a Hall Effect sensor. Using the teachings disclosed herein, one or ordinary skill in the art will understand that other sensors may also be used to detect the rotation of impeller 142 and/or to determine its speed of rotation. For example, magneto resistive, a reed switch, variable reluctance, reflective optical, transmissive optical, and others may be used as well.

Additionally, the present invention is not limited to only the air flow measuring device 140 as shown in the figures. More specifically, other devices having different impeller and/or fan blade configurations and sensor placement may be used as well including turbines, squirrel cage type blades, and others as well. Additionally, the sensor and/or magnet arrangements can also be varied while still providing a signal indicative of the rotation and, therefore, air flow including air flow rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
    an air passageway defined by the appliance and configured for circulating air through at least part of the appliance;
    a blower in fluid communication with said air passageway and configured for selectively causing a flow of air through said air passageway; and
    an air flow measuring device positioned at least partly within said air passageway and positioned so as to measure the flow of air through said passageway that is caused by blower, said air flow measuring device comprising:
        a rotatable impeller disposed at least partly within said air passageway, said rotatable impeller comprising
        a rotatable hub defining an exterior circumferential surface, and
        a plurality of blades positioned on the exterior circumferential surface and configured for causing said hub to rotate due to the flow of air created by said blower;
        a sensor positioned adjacent to said rotatable impeller and within said rotatable hub, said sensor configured for measuring the rotational speed of said impeller and generating a signal relating to such measuring; and, a controller in communication with said air flow measuring device and configured to perform one or more actions based on the measuring provided by said sensor.

2. An appliance as in claim 1, wherein said air flow measuring device is located downstream of the blower and at least partly in the flow of air within said passageway.

3. An appliance as in claim 1, wherein said sensor is a Hall Effect sensor.

4. An appliance as in claim 3, wherein said rotatable hub defines an interior circumferential surface, and wherein said air flow measuring device further comprises a magnet attached to the interior circumferential surface of said rotatable hub.

5. An appliance as in claim 1, wherein said sensor is selected from the group consisting of a Hall Effect sensor, a magneto resistive sensor, a reed switch sensor, a variable reluctance sensor, a reflective optical sensor, and a transmissive optical sensor.

6. An appliance as in claim 1, further comprising:
a controller that is in communication with said sensor, said controller configured for;
receiving a signal from said sensor that is indicative of the rotational speed of said rotatable impeller;
determining whether the flow of air through said air passageway, as indicated by the rotational speed of said impeller, meets a predetermined level, if not, then
initiating a remedial action.

7. An appliance as in claim 6, wherein the remedial action comprises deactivating at least part of the appliance.

8. An appliance as in claim 6, wherein the remedial action comprises providing an alarm or other notification to a user of the appliance, deactivating at least part of the appliance, or both.

9. An appliance as in claim 1, wherein the appliance is an oven having a cooking chamber with one or more heat sources, the appliance further comprising:
a temperature sensing device for measuring the temperature of the cooking chamber;
a controller that is in communication with said air flow measuring device and said temperature sensing device, said controller configured for;
receiving a signal from said air flow measuring device that is indicative of the rotational speed of said rotatable impeller;
receiving a signal from said temperature sensing device that is indicative of the temperature in said cooking chamber;
determining whether the flow of air through said air passageway meets a predetermined level for the temperature of said cooking chamber and, if not, then
initiating a remedial action.

10. An appliance as in claim 1, wherein the appliance is an oven having a cooking chamber with one or more heat sources, the appliance further comprising:
a user interface for user selection of either a "cooking" or "cleaning" mode of oven operation;
a controller that is in communication with said air flow measuring device and said user interface, said controller configured for
receiving a signal from said air flow measuring device that is indicative of the rotational speed of said rotatable impeller;
receiving a signal from said user interface that is indicative of the oven mode of operation;
determining whether the flow of air through said air passageway meets a predetermined level of air flow for the oven mode of operation selected by the user and, if not, then
initiating a remedial action.

11. An appliance as in claim 10, wherein said predetermined level of air flow is a first value when said oven is in a "cooking" mode of operation, and a second, larger value when said oven is in a "cleaning" mode of operation.

12. A method for measuring a flow of air in an appliance, the flow of air created by a blower of the appliance, the method comprising the steps of:
placing a rotatable impeller into the flow of air created by the blower, said
rotatable impeller comprising
a rotatable hub defining an exterior circumferential surface, and
a plurality of blades positioned on the exterior circumferential surface and configured for causing said hub to rotate due to the flow of air created by said blower;
detecting the rotations of the impeller using a sensor positioned in the rotatable hub;
creating a signal indicative of the rotational speed of the impeller; and,
determining whether the air flow rate created by the fan meets a predetermined level and, if not, then
undertaking a remedial action with regard to the operation of the appliance.

13. A method for measuring a flow of air in an appliance as in claim 12, wherein said remedial action comprises providing an alarm or other notification to a user of the appliance.

14. A method for measuring a flow of air in an appliance as in claim 12, wherein said remedial action comprises deactivating at least part of the appliance.

15. A method for measuring a flow of air in an appliance as in claim 12, wherein said determining step comprises calculating the flow rate of air in the appliance.

16. A method for measuring a flow of air in an appliance as in claim 12, wherein said creating step comprises generating a pulse train indicative of the rotations of said impeller.

* * * * *